(12) United States Patent
Auguste et al.

(10) Patent No.: US 9,409,263 B2
(45) Date of Patent: Aug. 9, 2016

(54) METHOD FOR DETECTING AN ERROR IN THE INSTALLATION OF A SEAL IN A MASTER CYLINDER

(75) Inventors: Antony Auguste, Villiees/Marne (FR); Laurent Lhuillier, Le Blanc Mesnil (FR); Nicolas Quiniou, Villemonble (FR); Daniel Grech, Lamorlaye (FR); Carole Charpentier, Montmorency (FR)

(73) Assignee: ROBERT BOSCH GMBH, Stuttgart (DE)

( * ) Notice: Subject to any disclaimer, the term of this patent is extended or adjusted under 35 U.S.C. 154(b) by 395 days.

(21) Appl. No.: 13/994,511

(22) PCT Filed: Nov. 16, 2011

(86) PCT No.: PCT/EP2011/070216
§ 371 (c)(1),
(2), (4) Date: Oct. 30, 2013

(87) PCT Pub. No.: WO2012/079900
PCT Pub. Date: Jun. 21, 2012

(65) Prior Publication Data
US 2014/0041221 A1 Feb. 13, 2014

(30) Foreign Application Priority Data
Dec. 17, 2010 (FR) ...................... 10 04952

(51) Int. Cl.
| | |
|---|---|
| *B23P 15/10* | (2006.01) |
| *B60T 11/232* | (2006.01) |
| *B60T 11/236* | (2006.01) |
| *B60T 17/22* | (2006.01) |
| *F15B 7/08* | (2006.01) |
| *F15B 19/00* | (2006.01) |
| *F16J 15/32* | (2016.01) |

(52) U.S. Cl.
CPC ............... *B23P 15/10* (2013.01); *B60T 11/232* (2013.01); *B60T 11/236* (2013.01); *B60T 17/221* (2013.01); *F15B 7/08* (2013.01); *F15B 19/005* (2013.01); *F16J 15/3236* (2013.01); *F16J 15/3268* (2013.01); *Y10T 29/49236* (2015.01); *Y10T 29/49764* (2015.01); *Y10T 29/49776* (2015.01)

(58) Field of Classification Search
CPC ..... B23P 15/10; B60T 11/236; B60T 17/221; B60T 11/232; F16J 15/3268; F16J 15/3236; F15B 19/005; F15B 7/08; Y10T 29/49776; Y10T 29/49764; Y10T 29/49236
See application file for complete search history.

(56) References Cited

U.S. PATENT DOCUMENTS 4,698,999 A * 10/1987 Trick ........................ G01N 3/12
73/40
4,989,498 A 2/1991 Mori et al.

FOREIGN PATENT DOCUMENTS

CN 1458890 11/2003
CN 1623831 6/2005
(Continued)

*Primary Examiner* — John C Hong
(74) *Attorney, Agent, or Firm* — Norton Rose Fulbright US LLP

(57) ABSTRACT

A method is described for detecting an incorrectly installed seal in a master-cylinder having a seal. The master cylinder is subjected to a pressure comprised between approximately 0.3 and 0.6 MPa at the conclusion of master-cylinder assembly and, if there is a drop in the pressure, the seal is considered to have been installed in reverse in the groove of the master cylinder.

3 Claims, 3 Drawing Sheets

(56) References Cited

FOREIGN PATENT DOCUMENTS

| DE | 4425403 | 1/1996 |
|---|---|---|
| DE | 19754700 A1 | 6/1999 |
| EP | 1767423 | 3/2007 |
| FR | 2 398 237 | 2/1979 |
| FR | 2916405 | 11/2008 |
| JP | 820327 A | 1/1996 |
| JP | 11512675 A | 11/1999 |
| JP | 2005138671 A | 6/2005 |
| JP | 2009-001262 | 1/2009 |
| JP | 2010120480 A | 6/2010 |

\* cited by examiner

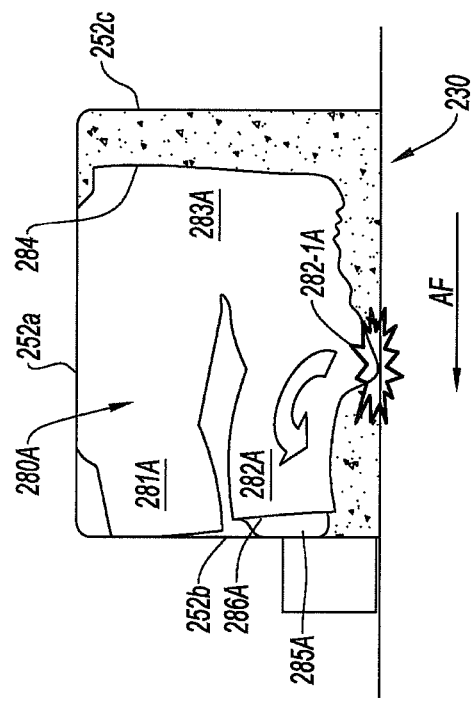
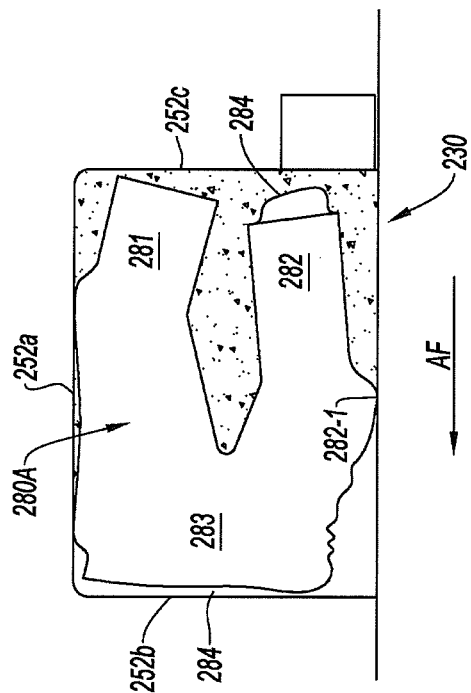

METHOD FOR DETECTING AN ERROR IN THE INSTALLATION OF A SEAL IN A MASTER CYLINDER

FIELD OF THE INVENTION

The present invention relates to a method for detecting an error in the installation of a seal in a master cylinder of a motor vehicle brake system, having a body equipped with a bore hole accommodating at least one piston actuated by the driver between a rest position and a braking position, and elastically returned to its rest position. The bore hole has at least one supply chamber connected to the brake fluid reservoir, and the piston separates the supply chamber connected to the brake fluid reservoir and a pressure chamber connected to the brake circuit. In addition, the supply chamber is bordered by two grooves that respectively receive a resupply seal separating the supply chamber from the pressure chamber, a seal separating the supply chamber and the exterior, with respect to the surface of the piston. The seal is a U-shaped peripheral seal, lying flat, one of whose branches is applied to the rear wall and the two adjacent walls of the groove, the other branch ensuring the seal by pressing on the piston.

BACKGROUND INFORMATION

In master cylinders as defined above, the seal, also known as an isolation seal or sealing cup, can be mounted in reverse in its groove, which will not become apparent until the brakes are used, which presents a grave risk and requires the replacement of the master cylinder.

In the case of a simple master cylinder, there is only one supply chamber bordered by the resupply seal and seal, the first being placed behind the second in the direction of movement of the master-cylinder piston when actuated by the brake pedal. In the case of a tandem master cylinder, there are two pistons that operate in combination, each piston cooperating with a supply chamber and a pressure chamber.

The risk of reversed assembly, therefore, exists for both seals.

SUMMARY

An object of the present invention is the development of a method for detecting the incorrect installation of master-cylinder seals in a brake system capable of detecting backward or reversed installation.

The present invention concerns a detection method for a seal as described above, in that, after assembly of the master cylinder, the seal in the master cylinder is subjected to a test pressure and, in the event of a pressure drop, the seal is considered to have been installed in reverse in the master cylinder.

The method according to the present invention provides a very simple way for detecting the incorrect installation of one or both seals and can be implemented at the conclusion of the master-cylinder manufacturing process. This detection allows for immediate action on the master cylinder so one or more seals can be installed in a correct position.

By preference, compressed air is used as the control fluid; in this way the master cylinder is not soiled during a possible seal change or during its packaging and shipment to the automobile manufacturer.

According to another beneficial characteristic, the master cylinder and the seals are subjected to a pressure on the order of 0.3-0.6, MPa. This pressure is sufficient to detect incorrect installation of the seal or seals and act upon the master cylinder. In general, the extremely simple test for proper installation of the seals, elements useful in the correct operation of the master cylinder, provides a considerable benefit, avoiding the need to discard or replace master cylinders in brake systems, with all the drawbacks that such a replacement entails when the brake system has already been activated.

BRIEF DESCRIPTION OF THE DRAWINGS

FIG. 5A is a first illustration of the method for detecting the seal, or isolation seal, in the groove.
FIG. 5B is a second illustration of the method for detecting the seal, or isolation seal, in the groove

DETAILED DESCRIPTION

Figure 1:
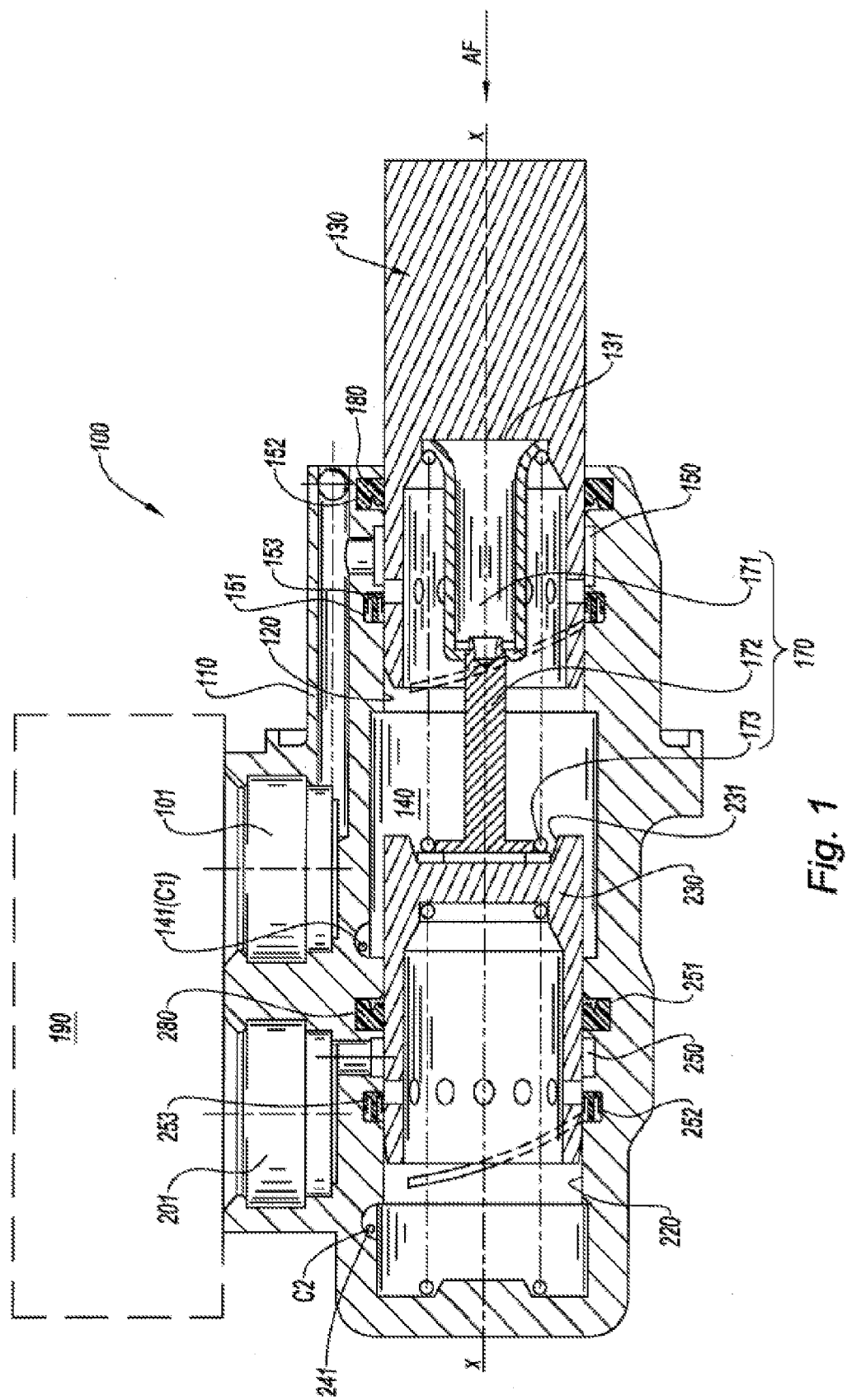
FIG. 1 is an axial cutaway of a tandem master cylinder.

According to FIG. 1, the invention concerns a method for detecting an incorrectly installed seal in master cylinder 100 in a brake system. The present example is for a tandem master cylinder.

The master cylinder will be described below for a portion of the simple master cylinder, it being understood that this description applies, in practice, in duplicate to the tandem master-cylinder assembly for all the elements the duplication and enabling control of two independent brake circuits.

Master cylinder 100 is composed of body 110 traversed by axial (xx) bore hole 120, which receives piston 130 controlled by a servobrake, not shown, or directly by the action exerted by the brake pedal.

The direction of displacement of piston 130 is indicated by arrow AF, which corresponds to a braking action that proceeds, according to FIG. 1, from right to left.

The top of the master cylinder is equipped with two inlets 101, 201 intended to receive the outlet endpieces from the brake fluid reservoir, which is roughly sketched.

Piston 130, which forms a slide valve, delimits, in bore hole 120, pressure chamber 140 connected to brake circuit C1 by drill hole 141, which issues into chamber 140. Pressure chamber 140 is separated, by hollow piston 130, from supply chamber 150, realized in body 110 of master cylinder 100 and, between its bore hole 120 and the exterior surface of piston 130, materialized by a peripheral groove in the body of the master cylinder. On the front and back side, supply chamber 150 is bordered by peripheral groove 151, 152 issuing in the bore hole.

Front groove 151 receives a peripheral resupply seal 153 and rear groove 152 a peripheral seal 180, also referred to as a seal.

Resupply seal 153 allows brake fluid to be supplied to pressure chamber 140 if there is a lack of brake fluid or if there is a sudden braking action when supply chamber 150 is still closed by piston 130. The opening and closing of resupply seal 153 is described in document FR 2,916,405. Seal 180, which separates supply chamber 150 from the exterior of master cylinder 100, provides a seal between bore hole 120 and the surface of piston 130, regardless of the circumstances.

The description of master cylinder 100 given above also applies to a simple master cylinder. In the case of tandem master cylinder 100 shown, there is a duplication of the pressure elements for the two brake circuits C1, C2. In this case, the portion described above is the primary part of the tandem master cylinder and the other portion is the secondary part. The description given above applies, under the same conditions, to the other elements covered by the invention, which bear the same reference numbers, but increased by 100.

The two pistons 130, 230 are connected by a telescopic rod 170 consisting of two parts 171, 172, which are kept apart by spring 173, and whose two extremities are applied, one to back wall 131 of piston 130 and the other to top 231 of piston 230.

Figure 2:
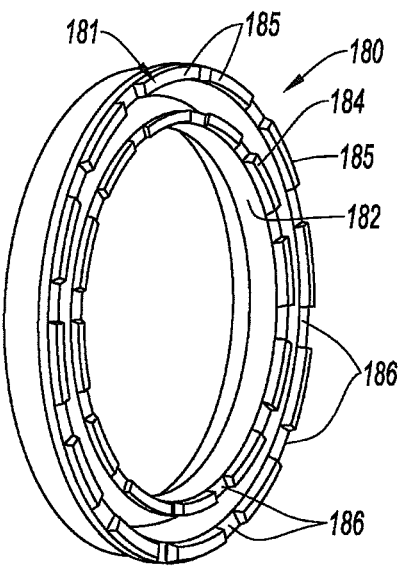
FIG. 2 is a perspective view of a seal.

FIG. 2 shows U-shaped seal 180, the ends of whose branches 181, 182 are equipped with projections 185 uniformly distributed along the periphery of each branch to form a crenellated profile. Faces 184 of projections 185 are planar in the direction already defined above, that is to say, they are contained in a plane perpendicular to axis xx of the bore hole or make a slight angle with this plane, in which they have the form of an angled conical surface with a very large crown. The recessed bottom of projections 185 is labeled with reference number 186 and forms passages between projections 185.

Figure 3:
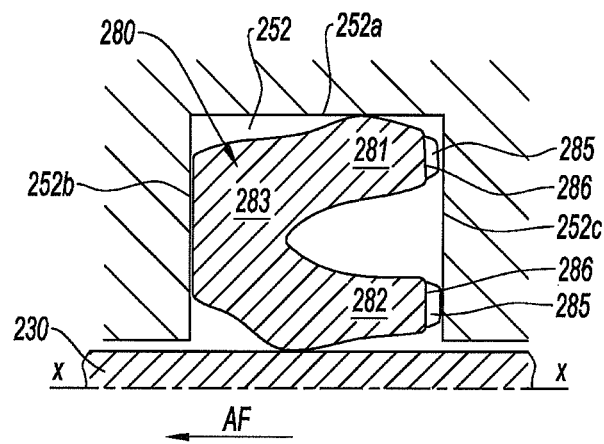
FIG. 3 is a large-scale cutaway of the seal placed in a groove in the body of the master cylinder.

FIG. 3 is a cutaway of seal 280 housed in its peripheral groove 252 and resting on piston 230. This groove 252 has a rectangular section with bottom 252a, and two sides 252b, 252c, radially directed with respect to the axis (xx). Seal 280 has a flat, U-shaped section with two branches 281, 282. Outer branch 281, with respect to the axis (xx) of piston 230, reaches bottom 252a, of groove 252, and inner branch 282, with respect to axis xx, rests against the outside surface of piston 230. Both branches 281, 282 are connected and form base 283, which rests against side 252b,, located in the direction of thrust, AF, of piston 230. Branches 281, 282 are equipped with projections 285, which each includes a recessed bottom 286.

The plane surface of the end of one or both branches of the seal is said to be planar by convention. The side of groove 252c, is situated in a plane perpendicular to axis xx and the plane surface of the end of one or both branches is flattened against this side 252c, of the groove. This surface can be planar in the strict sense, that is, contained in a plane perpendicular to axis xx. But it can also be quasi-planar or "inclined" to such a plane; it then corresponds to a frustoconical surface of axis xx, with a very large angle at its peak or a very small complement, on the order of 0-10°. The plane surface is actually plane when the angle at the peak is equal to 180°.

Figure 4:
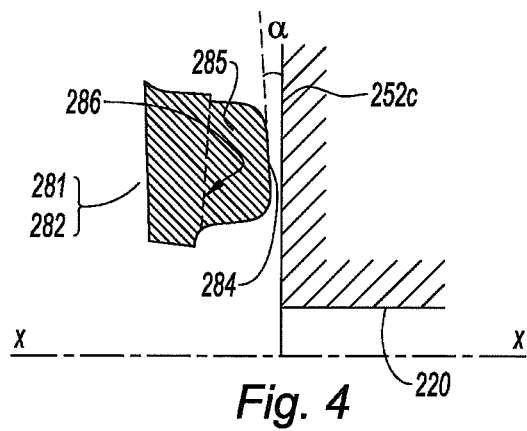
FIG. 4 is a large-scale view illustrating the shape of the end of a U-shaped branch of the seal of FIG. 2.

FIG. 4 shows the details of front face 284 of one or both of branches 281, 282. The section of this front face 284, represented in cutaway view, is inclined at an angle α, for example, on the order of 10°, to side 252c, of groove 252, against which this surface 284 is applied.

The detection method according to the invention to verify the proper installation of seal(s) 180, 280 will be described below using FIGS. 5A, 5B.

After assembling the master cylinder, the installation of the seals is tested prior to the installation of the master cylinder in a brake system, in particular, at the end of the production line.

The master cylinder is subjected to a test pressure on the order of 0.3-0.6, MPa using compressed air. If seal 280 (using this example) is installed in the position shown in FIG. 5A, the pressure spreads branches 281, 282, and &duly presses lower edge 282-1 of branch 282 against piston 230, ensuring the seal. The test pressure does not decrease.

If the pressure is maintained, this indicates that seal 280 is correctly installed (FIG. 5A).

However, if seal 280 is installed in reverse, as is the case in FIG. 5B, pressure is applied to face 284 of base 283A so that contact 282-1A separates from piston 130 and allows the pressurized fluid to escape. The pressure drop is the sign of the incorrectly installed seal. In this incorrectly installed position, the seal is given reference number 280A, and all the seal elements, otherwise identical to the seal described previously, are given the suffix A.

Once the master cylinder has been manufactured, detecting this pressure drop can be used to test proper installation of the seals before the master cylinder is installed in a brake circuit.

Preferably, the test is performed with compressed air or, more generally, a gas such that the master cylinder remains dry and is not soiled by the hydraulic liquid. It does not require cleaning before repair, packaging, and shipment; it can be easily disassembled for correct installation of the seal.

The invention claimed is:

1. A method for detecting an incorrect installation of a master cylinder seal in a motor vehicle brake system, the master cylinder including a body equipped with a bore hole accommodating at least one piston actuated by a driver between a rest position and a braking position and elastically returned to its rest position, wherein: the bore hole is provided with at least one supply chamber connected to a brake fluid reservoir, the piston separates the supply chamber from a pressure chamber connected to a brake circuit, the supply chamber is bordered by two grooves that respectively receive a resupply seal separates the supply chamber from the pressure chamber, and a seal separates the supply chamber from an exterior with respect to a surface of the piston, the seal is a U-shaped peripheral seal, lying flat, a branch of which is applied to a back of a first one of the two grooves, and two adjacent walls to another branch ensures the seal with the piston, the method comprising:

after assembly of the master cylinder, subjecting the seal in the master cylinder to a test pressure; and determining that the seal is installed in reverse in the master cylinder responsive to a pressure drop under the influence of the test pressure.

2. The method according to claim 1, further comprising: testing an installation of seals in the master cylinder by compressed air acting as a fluid.

3. The method according to claim 1, wherein the master cylinder and the seals are subjected to a pressure on the order of 0.3-0.6, MPa.

* * * * *